(12) United States Patent
Ishiwatari et al.

(10) Patent No.: US 7,947,366 B2
(45) Date of Patent: May 24, 2011

(54) ADHESIVE SHEET ARTICLE

(75) Inventors: Hironobu Ishiwatari, Tama (JP); Donald H. Lucast, North Saint Paul, MN (US); Koji Suzuki, Kaminoyama (JP)

(73) Assignee: 3M Innovative Properties Company, St. Paul, MN (US)

( * ) Notice: Subject to any disclaimer, the term of this patent is extended or adjusted under 35 U.S.C. 154(b) by 477 days.

(21) Appl. No.: 11/687,841

(22) Filed: Mar. 19, 2007

(65) Prior Publication Data

US 2008/0233348 A1    Sep. 25, 2008

(51) Int. Cl.
*B32B 7/12* (2006.01)
*B32B 15/04* (2006.01)
*B32B 9/00* (2006.01)

(52) U.S. Cl. ..... 428/343; 428/40.1; 428/41.3; 428/41.5; 428/42.1; 428/346; 428/355 R

(58) Field of Classification Search ............ 428/40.1, 428/41.3, 41.5, 42.1, 41.8, 343, 346, 355 R, 428/352, 906

See application file for complete search history.

(56) References Cited

U.S. PATENT DOCUMENTS

| | | |
|---|---|---|
| 2,399,545 A | 4/1946 | Davis |
| 2,940,868 A | 6/1960 | Patchell |
| 3,039,893 A | 6/1962 | Banigan et al. |
| 3,786,116 A | 1/1974 | Milkovich et al. |
| 3,842,059 A | 10/1974 | Milkovich et al. |
| 4,163,822 A | 8/1979 | Walter |
| 4,181,752 A | 1/1980 | Martens et al. |
| 4,379,201 A | 4/1983 | Heilmann et al. |
| 4,554,324 A | 11/1985 | Husman et al. |
| 4,619,979 A | 10/1986 | Kotnour et al. |
| 4,693,776 A | 9/1987 | Krampe et al. |
| 4,737,559 A | 4/1988 | Kellen et al. |
| 4,743,249 A | 5/1988 | Loveland |
| 4,771,891 A * | 9/1988 | Sorensen et al. ........... 206/459.5 |
| 4,833,179 A | 5/1989 | Young et al. |
| 4,843,134 A | 6/1989 | Kotnour et al. |
| 4,889,234 A * | 12/1989 | Sorensen et al. ........... 206/459.5 |
| 4,995,382 A | 2/1991 | Lang et al. |
| 5,382,451 A | 1/1995 | Johnson et al. |

(Continued)

FOREIGN PATENT DOCUMENTS

EP    0190814 A2    8/1986

(Continued)

OTHER PUBLICATIONS

Y. Yamashita et al., Synthesis of Amphiphilic Graftcopolymers From Polystyrene Macromonomer, Polymer Journal, 14, 255-260 (1982).

(Continued)

*Primary Examiner* — Patricia L Nordmeyer
(74) *Attorney, Agent, or Firm* — Trisha D. Adamson

(57) ABSTRACT

An adhesive tape comprising a hot-melt pressure sensitive adhesive layer that comprises a lattice pattern formed by at least two linear strips that intersect; wherein the lattice pattern forms a plurality of parallelogrammic openings, having a major diagonal line (A) and a minor diagonal line (B), wherein the ratio of the major diagonal line (A) of the opening to the minor diagonal line (B) thereof is from 15 to 1; the length of the major diagonal line (A) is from 0.5 mm to 10 mm; and the length of the minor diagonal line (B) is from 0.3 to 7 mm.

20 Claims, 1 Drawing Sheet

U.S. PATENT DOCUMENTS

| | | | |
|---|---|---|---|
| 5,496,603 | A | 3/1996 | Riedel et al. |
| 5,506,279 | A | 4/1996 | Babu et al. |
| 5,633,007 | A | 5/1997 | Webb et al. |
| 5,637,646 | A | 6/1997 | Ellis |
| 5,641,506 | A | 6/1997 | Talke et al. |
| 5,782,787 | A | 7/1998 | Webster |
| 5,804,610 | A | 9/1998 | Hamer et al. |
| 5,861,348 | A | 1/1999 | Kase |
| 5,866,249 | A | 2/1999 | Yarusso et al. |
| 6,063,838 | A | 5/2000 | Patnode et al. |
| 6,495,229 | B1 | 12/2002 | Carte et al. |
| 6,866,899 | B2 | 3/2005 | Wright |
| 6,953,602 | B2 | 10/2005 | Carte et al. |
| 7,105,225 | B2 | 9/2006 | Birkholz et al. |

FOREIGN PATENT DOCUMENTS

| | | |
|---|---|---|
| JP | A 10-33741 | 2/1989 |
| JP | A 2002-233545 | 9/1990 |
| JP | A-4-110723 | 4/1992 |
| JP | 4-110723 | 9/1992 |
| JP | 09-220252 | 8/1997 |
| JP | A 10-328231 | 12/1998 |
| JP | A 2000-25771 | 1/2000 |
| JP | 2000-502385 | 2/2000 |
| JP | A 2000-109763 | 4/2000 |
| JP | 2001-519455 | 10/2001 |
| JP | 2003-503540 | 1/2003 |
| JP | A 2003-509121 | 3/2003 |
| JP | 2003-389443 | 11/2003 |
| JP | 2004-273545 | 9/2004 |
| JP | 2005-514476 | 5/2005 |
| JP | 2006-087488 | 4/2006 |
| WO | WO 93/05123 A1 | 3/1993 |
| WO | WO 94/11175 A1 | 5/1994 |
| WO | WO 99/18166 A1 | 4/1999 |
| WO | WO 00/32142 A1 | 6/2000 |
| WO | WO 00/78885 A1 | 12/2000 |
| WO | WO 00/78885 A1 | 12/2000 |
| WO | WO 03/057741 A1 | 7/2003 |
| WO | WO 03/089153 | 10/2003 |

OTHER PUBLICATIONS

K. Ito, et al., Syntheses of Methyl Methacrylate-Stearyl Methacrylate Graft Copolymers and Characterization by Inverse Gas Chromatography, Macromolecules, 13, 216-221 (1980).

Japanese Office Action dated Dec. 15, 2009 for JP Patent Application No. 2004-273545, 2 pgs., English-language translation, 3 pgs.

Argument filed on Jun. 14, 2010 for JP Patent Application No. 2004-273545; English-language translation only; 7 pgs.

* cited by examiner

ADHESIVE SHEET ARTICLE

BACKGROUND

Pressure sensitive adhesive tapes used in medical applications are placed against the skin of a human body for a predetermined period of time. In general, the adhesive tape is required to repeatedly expand and contract in accordance with the user's movements while on the skin as described in JP-A 2002-233545. When the pressure sensitive adhesive tape has limited elasticity and poor skin conformability, then the tape cannot smoothly follow the expansion and the contraction of the skin, and therefore may irritate the skin.

In addition, pressure sensitive adhesive tapes used in medical applications should be moisture-permeable and air-permeable. Pressure sensitive adhesive tapes with poor moisture-permeability or air-permeability are placed against skin, the tape may trap moisture produced by skin, and increase discomfort on the skin from trapped perspiration. This trapped moisture may result in irritation, including a rash on the skin.

Coating pressure sensitive adhesives in a pattern on a substrate has been proposed in the art to address moisture and air permeability. U.S. Pat. Nos. 6,495,229 and 6,953,602 (JP-A 2003-509121) disclose an adhesive article that comprises a substrate and a pressure sensitive adhesive layer provided on the surface of the substrate in a pattern, wherein the pattern of the adhesive layer has an adhesive free area of less than about 25% and wherein the adhesive article has a water vapor transmission rate of greater than about 2000 $g/m^2/24$ hour. JP-UM-A 4-110723, JP-A 10-328231 and JP-A 10-33741 disclose a pressure sensitive adhesive tape having a pressure sensitive adhesive layer in a striped or wavy pattern provided on at least one surface of an air-permeable or moisture-permeable substrate, in which air permeation is facilitated through the space between the strips.

U.S. Pat. Nos. 2,940,868; 4,163,822; 5,633,007; and 5,782,787 disclose a medical adhesive sheet comprising a pressure sensitive adhesive layer with a pattern formed by solvent coating. U.S. Pat. No. 5,641,506 discloses a medical patch material with a support coated with a pressure sensitive hot-melt adhesive coating, formed by means of gravure printing, that a) forms coherent webs in the lengthwise and transverse direction, which include island-shaped adhesive-free areas; b) has the proportion of the adhesive-free areas amount to between 30 and 60%, preferably between 40 and 57% of the total surface, and c) has a coat weight of the adhesive amount to between 30 and 160 $g/m^2$, preferably between 40 and 120 $g/m^2$.

However, patterned adhesives known in the art have the following problems. The patterned adhesives lack skin conformability at least in part because the patterned adhesives fail to conform to the pattern of skin and fail to remain elastic substantially irrespective of direction, like the skin. Rather, the tape may interfere with the expansion and the contraction of skin in one or more directions, causing mechanical irritation. Further, the patterned adhesives can either be difficult to coat finely divided patterns or fail to retain the pattern over time.

SUMMARY OF THE INVENTION

This invention provides a pressure sensitive adhesive tape for medical applications with improved skin conformability that is retained over time. The pressure sensitive adhesive tape has reduced mechanical irritation during use, and reduced mechanical irritation when removed by peeling from the skin in any direction.

In one aspect, the claimed invention provides a pressure sensitive adhesive tape having a hot-melt pressure sensitive adhesive layer that comprises a lattice pattern formed by at least two linear strips that intersect; wherein the lattice pattern forms a plurality of parallelogrammic openings, having a major diagonal line (A) and a minor diagonal line (B), wherein the ratio of the major diagonal line (A) of the opening to the minor diagonal line (B) thereof is from 15 to 1, more preferably from 10 to 1; the length of the major diagonal line (A) is from 0.5 mm to 10 mm; the length of the minor diagonal line (B) is from 0.3 to 7 mm, more preferably from 0.5 to 3 mm, and wherein the ratio of the width (C) of the linear strip between the parallelogrammic openings to the minor diagonal line length (B) is from 0.1 to 3, preferably 1 to 3, when (C) is measured at the narrowest point between the minor diagonal lines (B) of adjacent parallelogrammic openings.

In the adhesive layer, there is preferably an adhesive free area within the parallelogrammic openings. The total of adhesive free area within the parallelogrammic openings is preferably at least 25% of the adhesive layer. The total of adhesive free area within the parallelogrammic openings is preferably at most 75% of the adhesive layer. The density (or number) of adhesive free openings, i.e. parallelogrammic openings, is at least 5 openings per $cm^2$ of the adhesive layer. The density of adhesive free openings is preferably at most 150 openings per $cm^2$ of the adhesive layer.

Another aspect of the claimed invention is to provide a hot melt pressure sensitive adhesive layer that does not flow over time, thereby retaining the skin conformability provided by the lattice pattern over time. Preferably, the adhesive layer does not flow for at least 19 days at 66° C., preferably at least 57 days at 66° C. An indicator of the pressure sensitive adhesive's ability to retain the pattern over time is given by % recovery. The % recovery of the pressure sensitive adhesive is at least 35% when measured by Creep Compliance testing described in the Examples section.

Figure 1:
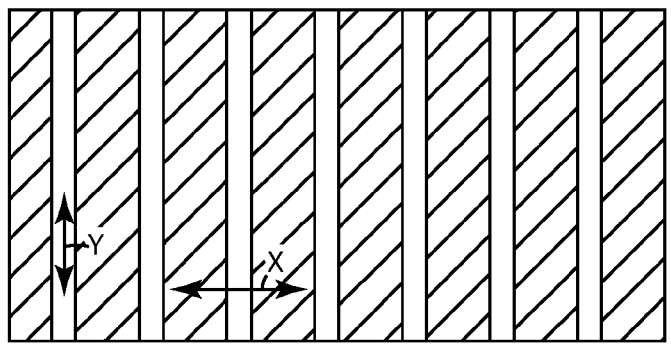
FIG. 1 is a top plan view of an adhesive tape with a striped adhesive pattern as known in the art.

In the drawings, the shadowed parts indicate a region having an adhesive pattern, and the non-shadowed parts indicate a region not having an adhesive pattern.

DETAILED DESCRIPTION OF PREFERRED EMBODIMENTS

The claimed invention provides a pressure sensitive adhesive tape having a patterned pressure sensitive adhesive layer that retains the pattern over time. The adhesive layer of this invention forms a finely divided lattice pattern. To retain the pattern in the adhesive layer over time, the adhesive layer comprises a pressure sensitive adhesive with a recovery % of at least 35% as measured by the Compliance Creep Test provided in the Examples section below. Adhesives formulated with a recovery % of at least 35% can retain the pattern of the adhesive layer over time. By "time," it is generally meant that the adhesive layer does not flow for at least 19 days at 66° C., and preferably at least 57 days at 66° C.

To achieve the fine lattice pattern, an adhesive that has lower viscosity (soft adhesive) is desirable to use when coating on a substrate due to its ease in coating and ease of forming a pattern. However, soft adhesives also have a tendency to collapse over time, causing the pattern to lose its shape, and by consequence the benefits the pattern imparts. The adhesive layer of the present invention retains the ease of coatability and pattern formation of a soft adhesive, yet also retains the adhesive pattern over time.

To retain the pattern shape of the formed adhesive layer, the recovery % of the pressure sensitive adhesive should be at least 35%, as measured by the Creep Compliance Test described below. When the recovery % of the adhesive is less than 35%, the adhesive flows with time, and the pattern can collapse. Thus, the present invention provides a softer adhesive to coat the adhesive layer in a fine lattice pattern. Once coated, the adhesive layer is cross-linked further to achieve an adhesive with greater resistance to flow over time and retain the fine lattice pattern. Preferably, after coating the adhesive layer, the cold flow characteristics of the adhesive layer are controlled via further radiation-induced crosslinking as described below.

Adhesive Components

The adhesives formulated for use in the invention are typically adhesives suitable for use in medical applications. In general, preferred adhesives for medical applications include acrylic pressure sensitive adhesives, rubber-type pressure sensitive adhesives and silicone-type pressure sensitive adhesives such as those described in Patent Publication Nos. WO/03057741, WO/9918166 and WO/0032142. Particularly preferred are adhesives capable of hot-melt coating. For example, the hot-melt rubber-type pressure sensitive adhesives suitable in the present invention may be a mixture of a synthetic rubber such as styrene-isoprene-styrene (SIS) rubber and a tackifier such as a rosin-type tackifier. Other synthetic rubbers also usable herein are styrene-butadiene-styrene (SBS), styrene-butadiene rubber (SBR), nitrile-butyl rubber (NBR), chloroprene rubber, silicone rubber, acrylic rubber, butyl rubber, urethane rubber, ethylene-propylene rubber, and fluororubber.

Another hot-melt pressure sensitive adhesive may be, for example, a copolymer of (i) at least one monoethylenic unsaturated (meth)acrylate having an alkyl group with at least 4 carbon atoms on average (hereinafter this is referred to as "first monomer") and (ii) at least one monoethylenic unsaturation-reinforcing monomer (hereinafter this is referred to as "second monomer").

The first monomer is a monoethylenic unsaturated (meth)acrylate having an alkyl group with at least 4 carbon atoms on average (that is, alkyl acrylate or alkyl methacrylate). Preferably, the alkyl group of the (meth)acrylate has from 4 to 14 carbon atoms. The alkyl group may optionally have a hetero atom, and may be linear or branched. When homo-polymerized, the monomer generally gives a pressure sensitive adhesive polymer having a glass transition temperature of lower than about 10° C. Preferably, the (meth)acrylate monomer is has the following general formula:

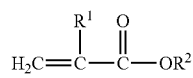

Wherein $R^1$ represents H or $CH_3$, with the latter corresponding to a case where the (meth)acrylate monomer is a methacrylate monomer; $R^2$ is selected from a linear or branched hydrocarbon group, optionally containing one or more hetero atoms; and the number of the carbon atoms constituting the group $R^2$ is preferably from 4 to 14, more preferably from 4 to 8.

Not limited thereto, examples of the first monomer are 2-methylbutyl acrylate, isooctyl acrylate, isooctyl methacrylate, lauryl acrylate, 4-methyl-2-pentyl acrylate, isoamyl acrylate, sec-butyl acrylate, n-butyl acrylate, n-hexyl acrylate, 2-ethylhexyl acrylate, 2-ethylhexyl methacrylate, n-octyl acrylate, n-octyl methacrylate, 2-methoxyethyl acrylate, 2-ethoxyethyl acrylate, n-decyl acrylate, isodecyl acrylate, isodecyl methacrylate, and isononyl acrylate. (Meth)acrylates preferred for use as the first monomer are isooctyl acrylate, 2-ethylhexyl acrylate, 2-methylbutyl acrylate, and n-butyl acrylate. Using combinations of various monomers grouped as the first monomer, the hot-melt pressure sensitive adhesive component for the adhesive layer in the invention may be prepared.

The hot-melt acrylic pressure sensitive adhesive of the adhesive layer in the invention preferably contains at least 85% by weight of the first monomer, based on the total mass of the hot-melt acrylic adhesive, more preferably at least 90% by weight, most preferably at least 95% by weight of the first monomer. Preferably, the hot-melt acrylic adhesive of the adhesive layer in the invention contains at most 99% by weight of the first monomer, based on the total mass of the hot-melt acrylic adhesive, more preferably at most 98% by weight, most preferably at most 96% by weight of the first monomer.

The second monomer, monoethylenic unsaturation-reinforcing monomer increases the glass transition temperature of the copolymer. The "reinforcing" monomer used in this specification increases the modulus of the adhesive, thereby increasing the strength thereof. Preferably, the second monomer has a homopolymer glass transition temperature (Tg) of at least about 10° C. The glass transition temperature (Tg) may be measured according to JIS-K7121. More preferably, the second monomer is a reinforcing monoethylenic unsaturated radical-copolymerizable (meth)acrylic monomer, including acrylic acid, methacrylic acid, acrylamide and acrylate. Not limited thereto, examples of the second monomer are acrylamides such as acrylamide, methacrylamide, N-methylacrylamide, N-ethylacrylamide, N-methylolacrylamide, N-hydroxyethylacrylamide, acetonacrylamide, N,N-dimethylacrylamide, N,N-diethylacrylamide, N-ethyl-N-amino ethylacrylamide, N-ethyl-N-hydroxyethylacrylamide, N,N-dimethylolacrylamide, N,N-dihydroxyethylacrylamide, t-butylacrylamide, dimethylaminoethylacrylamide, N-octylacrylamide, and 1,1,3,3-tetramethylbutylacrylamide. Other examples of the second monomer are acrylic acid and methacrylic acid, itaconic acid, crotonic acid, maleic acid, fumaric acid, 2,2-(diethoxy)ethyl acrylate, hydroxyethyl acrylate or methacrylate, 2-hydroxypropyl acrylate or methacrylate, methyl methacrylate, isobutyl acrylate, n-butyl methacrylate, isobornyl acrylate, 2-(phenoxy)ethyl acrylate or methacrylate, biphenyl acrylate, t-butylphenyl acrylate, cyclohexyl acrylate, dimethyladamantyl acrylate, 2-naphthyl acrylate, phenyl acrylate, N-vinylpyrrolidone, and N-vinylcaprolactam. Reinforcing monofunctional acrylic monomers preferred for use as the second monomer are acrylic acid and methacrylic acid. Using combinations of various reinforcing monofunctional monomers that are classified as the second monomer, hot-melt acrylic pressure sensitive adhesive copolymers for use in the invention may be produced.

Preferably, the hot-melt acrylic pressure sensitive adhesive in the adhesive layer contains the second monomer in an amount of at least 1% by weight, based on the total mass of the hot-melt acrylic adhesive, more preferably at least 2% by weight, most preferably at least 6% by weight. Preferably, the hot-melt acrylic pressure sensitive adhesive in the adhesive layer contains the second monomer in an amount of at most 15% by weight, based on the total mass of the hot-melt acrylic adhesive, more preferably at most 10% by weight, most preferably at most 5% by weight.

The hot-melt acrylic pressure sensitive adhesive in the adhesive layer in the invention may contain, in addition to the above-mentioned first and second monomers, any other monomer capable of copolymerizing with them, for example, a vinyl ester and an N-vinyl lactam. Not limited thereto, examples of the comonomer are polystyrene macromer, poly (methyl methacrylate) macromer, poly(methoxyethylene glycol) macromer, 4-(N,N-dimethylamido)butyl acrylate, N-vinylpyrrolidone; N-vinyllactams such as N-vinylcaprolactam; and N-vinylformamide; and combinations of the foregoing. Preferably, the amount of the optional comonomer in the hot-melt acrylic pressure sensitive adhesive may be from 2% by weight to 20% by weight of the adhesive.

The pressure sensitive adhesive layer may further comprise a thermoplastic material as a component. For example, the adhesive layer can comprise a blend of pressure sensitive adhesive and thermoplastic material immiscible with the pressure sensitive adhesive component at use temperature. The pressure sensitive adhesive blend may include at least 40 weight percent pressure sensitive adhesive and at least 5 weight percent thermoplastic material and have a morphology comprising at least two distinct domains, a first domain being substantially continuous and a second being fibrinous to schistose as further described in PCT Publication No. WO/9918166.

The adhesive layer for use in the invention may optionally contain a film-forming component. Preferably, the film-forming component is added to the adhesive layer when the adhesive tape is produced without a supporting substrate, as further described in Applicants' copending application JP Patent Application No. 2004-273545, filed on Sep. 21, 2004, and incorporated by reference herein in its entirety. The film-forming component comprises a thermoplastic resin that is solid at room temperature but is not tacky, more preferably a thermoplastic resin having a softening point falling within a range of from 25 to 300° C. The softening point may be measured according to JIS-K7206. Preferably, the thermoplastic resin may be selected from a group consisting of polyvinyls, polyesters, polyurethanes, cellulose resins, polyamides and acetal resins. Examples of the polyvinyls include polyolefins and acrylic resins; examples of the polyolefins include polyethylene (low-density polyethylene, high-density polyethylene, linear low-density polyethylene), polypropylene, polystyrene, polyvinyl alcohol, polyvinyl acetate, ethylene-vinyl acetate copolymer; examples of the acrylic resins include acrylonitrile-butadiene-styrene resin, acrylonitrile-styrene resin, polymethyl methacrylate. Examples of the polyesters are polyethylene terephthalate, and polycarbonate. One example of the cellulose resins is cellulose acetate. Preferably, the film-forming component is uniformly dispersed in the hot-melt adhesive component.

When the adhesive layer contains the above-mentioned film-forming component and especially when the layer provides an adhesive tape without a supporting substrate, then the proportion of the film-forming component to the hot-melt adhesive may be such that the hot-melt adhesive is from 40% to 95% by weight and the film-forming component is from 5% to 60% by weight. If the film-forming component is less than 5%, then the strength of the adhesive layer may be low. If the film-forming component exceeds 60% by weight, the adhesion to skin of the adhesive layer may be low.

For improving the shear strength, the cohesion strength, the modulus of elasticity, and the initial tackiness or the initial adhesion power of the adhesive layer, the copolymer and the optional film-forming component that constitute the adhesive layer may be crosslinked. Preferably, the crosslinking agent is copolymerizable with the first monomer, the second monomer and the other optional monomer. The crosslinking agent may produce chemical crosslinking (e.g., covalent bonding). The crosslinking agent may also produce physical crosslinking to be caused by the formation of a reinforcing domain through phase separation or acid/base interaction. Crosslinking agents suitable for use herein are disclosed in U.S. Pat. Nos. 4,379,201; 4,737,559; 5,506,279; and 4,554,324. Using combinations of various crosslinking agents, the copolymer component for use in the invention may be produced. The crosslinking agents can include a chemical crosslinking agent, a physical crosslinking agent and a metal crosslinking agent. When the crosslinking agent is used, then its amount is preferably from 0.1 parts to 10 parts based on 100 parts of the monomer.

The chemical crosslinking agent can be, for example, a thermal crosslinking agent such as polyaziridines, such as 1,1'-(1,3-phenylenedicarbonyl)-bis-(2-methylaziridine), often referred to as "bisamide". The chemical crosslinking agent of this type may be added to an acid functional group-containing solvent-type pressure sensitive adhesive, after polymerization, and this may be thermally activated while the coating adhesive is dried in a furnace.

The chemical crosslinking agent may also be a copolymerizable monoethylenic unsaturated aromatic ketone monomer without an ortho-aromatic hydroxyl group, for example, as illustrated in U.S. Pat. No. 4,737,559. Its examples are para-acryloxybenzophenone, para-acryloxyethoxybenzophenone, para-N-(methylacryloxyethyl)-carbamoylethoxybenzophenone, para-acryloxyacetophenone, ortho-acrylamidacetophenone, and acrylated anthraquinones. Other suitable crosslinking agents are chemical crosslinking agents that rely on a free radical for carrying out the intended crosslinking reaction. For example, reagents such as peroxides can provide a precursor for a free radical. When heated, the precursor produces a free radical that causes crosslinking reaction of polymer chains.

Apart from thermal crosslinking agents or photosensitive crosslinking agents, for example, radiation such as UV rays, X rays, γ rays or electronic beam, or other high-energy electromagnetic radiation may be used for carrying out crosslinking.

The physical crosslinking agent may be a macromer having a high Tg, such as that containing a vinyl functional group and comprising polystyrene and polymethyl methacrylate as the principal ingredient thereof. The vinyl-terminated polymer-crosslinking monomer may be referred to as a high molecular weight monomer (that is, a macromer). A monomer of this type is well known, and may be prepared according to the methods disclosed in U.S. Pat. Nos. 3,786,116 and 3,842,059; and described in Y. Yamashita et al., *Polymer Journal*, 14, 255-260 (1982); and K. Ito et al., *Macromolecules*, 13, 216-221 (1980). In general, the monomer of this type may be prepared through anionic polymerization or free radical polymerization.

The metal crosslinking agent includes metal-containing salts or other metal-containing compounds. Suitable metals are, for example, zinc and titanium. Examples of the metal-containing compounds include zinc oxide, zinc ammonium carbonate, and zinc stearate.

For modifying the characteristics of the adhesive, any other additive may be added to the adhesive-forming component and the film-forming component, or may be added to these two components when they are mixed or when the mixture is applied to substrates. Additives include plasticizers, tackifiers, pigments, reinforcing agents, enhancing agents, flame retardants, antioxidants, and stabilizers. The additive may be added in an amount sufficient for obtaining the desired final use characteristics. If desired, a filler may be added to the adhesive, such as glass or polymer bubbles or beads (either foamed or non-foamed), fibers, hydrophobic or hydrophilic silica, or finely-ground polymer particles of polyester, nylon, and polypropylene.

Preferably, a radical initiator is added to the adhesive for promoting the copolymerization of (meth)acrylate and acidic comonomer. The type of the initiator to be used may vary, depending on the polymerization method employed. A photoinitiator useful for polymerization of a polymerizable monomer mixture includes benzoin ethers such as benzoin methyl ether or benzoin isopropyl ether; substituted benzoin ethers such as 2-methyl-2-hydroxypropiophenone; aromatic sulfonyl chlorides such as 2-naphthalenesulfonyl chloride; and optically-active oxides such as 1-phenyl-1,1-propanedione-2-(O-ethoxycarbonyl)oxime. One example of commercially-available optical initiators is IRGRACURE 651 (2,2-dimethoxy-1,2-diphenylethan-1-one, sold by Ciba-Geigy Corporation). Examples of suitable thermal initiators are AIBN (2,2'-azobis(isobutyronitrile) hydroperoxides such as tert-butylhydroperoxide; and peroxides such as benzoyl peroxide, cyclohexane peroxide. In general, the amount of the initiator to be in the monomer composition may be from 0.005% by weight to 1% by weight based on the mass of the copolymerizable monomer.

For controlling the molecular weight of the copolymer to be produced, the monomer composition may optionally contain a chain transfer agent. Suitable chain transfer agents are alcohols (e.g., methanol, ethanol, isopropanol); halogenohydrocarbons such as carbon tetrabromide; sulfur compounds such as laurylmercaptan, butylmercaptan, ethanethiol, isooctyl thioglycolate (IOTG), 2-ethylhexyl thioglycolate, 2-ethylhexyl mercaptopropionate, 2-mercaptoimidazole, 2-mercaptoethyl ether; and their mixtures. The effective amount of the chain transfer agent varies depending on the molecular weight and the type of the desired chain transfer agent. In general, a non-alcohol chain transfer agent is used in an amount of from 0.001 to 10 parts by mass per 100 parts by mass of the whole monomer, preferably from 0.01 parts to 0.5 parts, and more preferably from 0.02 parts to 0.20 parts. An alcohol-containing chain transfer agent may be used in an amount exceeding 10 parts by mass per 100 parts by mass of the whole monomer.

Polymerization Methods

The copolymer may be produced through various polymerization methods. Some suitable methods for polymerization are described in U.S. Pat. Nos. 4,181,752; 4,833,179; 5,804,610; and 5,382,451.

For example, in a solution polymerization method, an alkyl (meth)acrylate monomer and an acid monomer are, along with a suitable inert organic solvent and, if used, a radical-copolymerizable crosslinking agent, put into a four-neck reactor equipped with a stirrer, a thermometer, a condenser, a dropping funnel and a temperature monitor. After the monomer mixture has been put into the reactor, a condensed thermal radical initiator solution is put into the dropping funnel. Next, the entire reactor and the dropping funnel and their contents are purged with nitrogen to form an inert atmosphere in and around them. Thus having been once purged with nitrogen, the solution in the container is heated and the added thermal initiator is decomposed, and the mixture is kept stirred all the time during the reaction. In general, in about 20 hours, a conversion of from about 98 to about 99% is attained. If desired, the solvent is removed, and the intended hot-melt applicable pressure sensitive adhesive is produced. If desired, the suitable inert organic solvent may be an organic liquid inert to the reaction mixture and to the product, and if not so, it should not have any negative influence on the reaction. The solvent of the type includes ethyl acetate, acetone, methyl ethyl ketone, and their mixtures. The amount of the solvent may be generally from about 30% by weight to about 80% by weight based on the total mass of the reaction mixture (monomer, crosslinking agent, initiator) and the solvent.

Another polymerization method is ultraviolet (UV)-initiating photopolymerization of a monomer mixture. The composition is applied onto a flexible carrier web, along with a suitable optical initiator and a crosslinking agent therein, and is subjected to polymerization in an inert atmosphere, or that is, in an oxygen-free atmosphere such as a nitrogen atmosphere. The coating layer is covered with a substantially UV-permeable plastic film and using a fluorescent-type UV lamp capable of giving an overall dose of about 500 mJ/cm$^2$, the monomer mixture is exposed to light through the film. A preferred example of a UV polymerization process is further described in PCT Publication No. WO 03/057741.

The copolymer may also be produced in any other mode of continuous radical polymerization in an extruder as described in U.S. Pat. Nos. 4,619,979 and 4,843,134; substantially adiabatic polymerization in a batch reactor as described in U.S. Pat. No. 5,637,646; or non-solvent polymerization such as that described for polymerization of packaged pre-adhesive composition in U.S. Pat. No. 5,804,610.

Optional Substrate

The adhesive layer may be provided on a supporting substrate, or may be a self-sustainable adhesive tape without a supporting substrate. Preferably, the adhesive layer is coated on a supporting substrate. The supporting substrate for use in the invention may be any substrate usable for pressure sensitive adhesive tapes in medical applications.

For example, it may be a perforated film, an open-cellular foam sheet, a foam or a laminated combination thereof, of an organic polymer of, for example, polyolefins such as polyethylene, polypropylene, polybutene, ethylene-propylene copolymer, ethylene-vinyl acetate copolymer, ethylene-ethyl acrylate copolymer; or polyurethanes, polyesters, polyamides or other plastics. The substrate may also be air-permeable and moisture-permeable by itself. For example, the substrate may be made of fabrics, nonwoven fabrics, melt-blown webs, foams, spun-bonded webs, thermal-bonded webs, spun-laced webs, paper, and thermally-embossed nonwoven fabrics, and those described in U.S. Pat. No. 5,496,603. More precisely, examples of the substrate may be woven fabrics, knitted fabrics or non-woven fabrics of an organic polymer such as cotton, polyvinyl alcohol or cellulose; paper; and perforated films of polyvinyl alcohol. If desired, the substrate may be processed for water repellency with a known water repellent. The substrate may be elastic or non-elastic. Preferably, the substrate has good air permeability and moisture permeability and has good elasticity. Especially preferred are elastic cotton fabrics (woven fabrics) or nonwoven fabrics. Further, water-proof substrates (e.g., urethane films) may also be used. In most embodiments, the supporting substrate will have a thickness of from 15 to 2000 μm.

The adhesive tape of the invention may be produced in the manner mentioned below. When the adhesive tape is formed of an adhesive layer alone, then it may be produced by applying a hot-melt adhesive onto a release film such as a surface-lubricated polyethylene terephthalate (PET) film. The release film may serve as a protective film until it is removed in use of the tape. On the other hand, when an adhesive tape having an adhesive layer on a supporting substrate is produced, then the adhesive layer formed on the release film in the manner as above may be transferred onto a supporting substrate to obtain the intended adhesive tape.

When the adhesive tape of the invention is not provided on a supporting substrate, then it is desirable that a non-tacky coating layer is formed on one surface of the adhesive layer. The non-tacky coating layer to be provided on the adhesive layer eliminates the adhesiveness of one surface of the adhesive layer without detracting from the flexibility of the adhesive layer. The thickness of the non-tacky coating layer may be generally from 0.01 to 30 μm, preferably from 0.01 to 15 μm, more preferably from 0.01 to 10 μm, even more preferably from 0.01 to 5 μm. If the thickness is greater than 30 μm, the coating layer may detract from the flexibility of the adhesive tape. If less than 0.01 μm, the coating layer may not sufficiently reduce the tackiness of one surface of the adhesive layer. The non-tacky coating layer may be formed of an ordinary release agent, for example, an acrylic release agent, a silicone release agent (e.g., GE-Toshiba Silicone's TPR6501), a polyurethane release agent, a printing ink (e.g., Dainichi Seika's Hilamic); or a non-tacky powder such as organic powder (e.g., starch, wheat flour, dogtooth violet starch), inorganic powder, metal powder, pigment (e.g., titanium oxide, carbon).

Adhesive Pattern and Methods of Making

Figure 3:
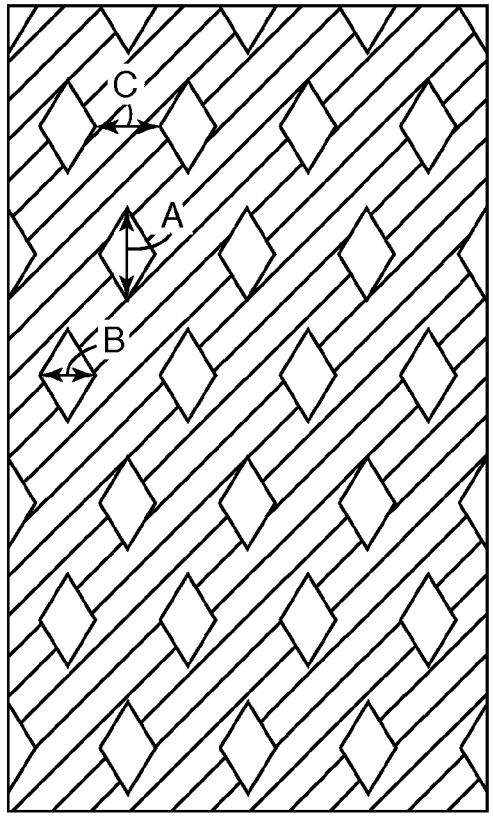
FIG. 3 is a top plan view of one embodiment of the adhesive tape of the present invention.

In most embodiments, the pressure sensitive adhesive layer is hot-melt coated in a lattice pattern comprising at least two linear strips that intersect. The lattice pattern forms a plurality of parallelogrammic openings, having a major diagonal line (A) and a minor diagonal line (B) with the length of the major diagonal line (A) from 0.5 mm to 10 mm and the length of the minor diagonal line (B) is from 0.3 to 7 mm. In a preferred embodiment, the ratio of the major diagonal line (A) of the opening to the minor diagonal line (B) is from 15 to 1. The pressure sensitive adhesive layer may also have a ratio of the width (C) of the linear strip between the parallelogrammic openings to the minor diagonal line length (B) from 0.1 to 3, when (C) is measured at the narrowest point between the minor diagonal lines (B) of adjacent parallelogrammic openings. In other words, (C) represents the width of the linear adhesive strip between the adjacent parallelogrammic openings measured at the narrowest point parallel to each minor diagonal line (B) (as shown in FIG. 3).

Having the pattern that has the dimension as above, the adhesive tape may follow a skin that expands and contracts in all directions (360°). In addition, since the pattern of the tape is similar to the surface pattern of skin, skin conformability may be thus imparted to the tape whereby the pain in peeling the tape may be reduced and the mechanical irritation during use on skin may also be reduced.

Figure 2:
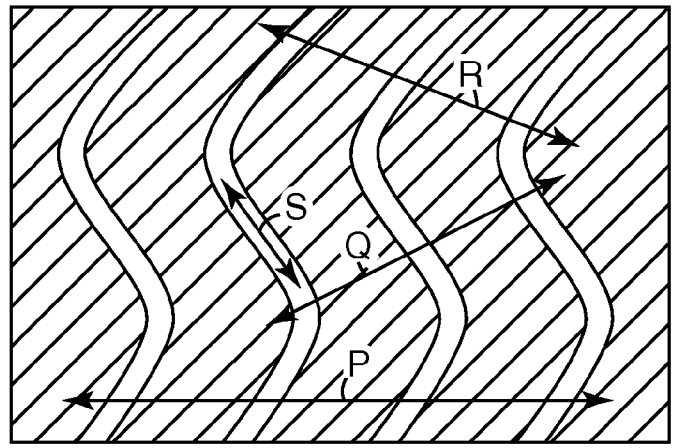
FIG. 2 is a top plan view of an adhesive tape with a wavy adhesive pattern as known in the art.

FIG. 1 and FIG. 2 show a striped adhesive pattern or a wavy adhesive pattern known in the art. These patterns fail to account for the surface pattern of human skin which generally have a triangular, square or other polygonal pattern on its surface and is therefore elastic substantially irrespective of the direction. When the adhesive tape of FIG. 1 is peeled in the X direction, then the adhesive area and the adhesive free area alternate during peel, making smooth peeling difficult to achieve. Accordingly, the tape may cause an excessive mechanical irritation to a skin. Similarly, the same peel effect, and subsequent irritation is possible where the adhesive tape of FIG. 2 is peeled in the direction P, Q or R.

During use of the adhesive tape of FIG. 1, mechanical irritation can occur when the adhesive tape is expanded or contracted in the direction Y. While not intending to be bound by theory, this may be caused by the continuous adhesive strips in the direction Y, which may interfere with the expansion and the contraction of skin in that direction. Similarly, the expansion and contraction intereference effect is possible where the adhesive tape of FIG. 2 is expanded and contracted in the direction S.

FIG. 3 presents a top view of an adhesive tape of the present invention. The adhesive tape has a lattice pattern with parallelogrammic openings (diamond-shaped openings in the drawing), in which the ratio of the major diagonal line (A) of the opening to the minor diagonal line (B) thereof is from 15 to 1, and preferably from 10 to 1. If the ratio of the major diagonal line (A) of the opening to the minor diagonal line (B) thereof is larger than 15, the major diagonal line (A) of the opening may be too long as compared with the minor diagonal line (B), and result in a profile of the parallelogrammic openings that are different from the surface pattern of a skin, which can affect the ease of peel from the skin. On the contrary, if the ratio of the major diagonal line (A) of the opening to the minor diagonal line (B) thereof is smaller than 1, coating with the adhesive layer may be difficult.

The major diagonal line (A) in the opening area of the parallelogram is preferably 0.5 to 10 mm. The length of the minor diagonal line (B) is from 0.3 to 7 mm, and preferably from 0.5 to 3 mm. When the (A) is less than 0.5 mm or (B) is less than 0.5 mm, coating the adhesive layer may become more difficult. On the other hand, when the (A) is more than 10 mm, or (B) is more than 3 mm, too many adhesive-free areas are created on the edge of the adhesive sheet, making the adhesive sheet detach too quickly during use.

Regarding the length of the minor diagonal line (B), when the tape of the invention is slit into a rolled tape, then the tape width may be small (for example, 12.5 mm, 25 mm or 75 mm). Accordingly, the length of the minor diagonal line (B) of the tape is preferably 0.3 to 7 mm. Depending on the width of the adhesive tape, the length may be more preferably smaller, for example, from 0.5 to 3 mm. If the minor diagonal line length (B) is larger than 7 mm (for example, with a tape slit to have a width of 12.5 mm), then the number of the adhesive free openings is excessive, and affects adhesiveness to a skin. When the minor diagonal line length (B) is smaller than 0.3 mm, coating the hot-melt adhesive may be difficult.

The density (i.e., of the number) of the parallelogram openings is at least 5 openings per $cm^2$. The density of the parallelogram openings is at most 150 openings per $cm^2$, and preferably at most 50 openings per $cm^2$. When the density of the parallelograms is less than 5 per $cm^2$, the adhesive free area becomes too large; namely, there are many adhesive free area on the edge of the adhesive sheet, which may cause premature lift from skin. On the other hand, when the density of the openings is more than 150 per $cm^2$, coating the adhesive layer may become difficult.

The thickness of the adhesive layer in the invention may be any thickness that achieves the lattice pattern described above. In general, however, the thickness may be from 5 to 1000 μm, preferably from 10 to 350 μm. The coating weight of the adhesive layer is from 7 to 200 $g/m^2$, and preferably from 15 to 50 $g/m^2$.

The adhesive free area is at least 25% in the pressure sensitive adhesive layer. The lattice pattern formed by the pressure sensitive adhesive creates an opening area (adhesive free area) of a parallelogram in the pressure sensitive adhesive layer. The opening area is no more than 75% in the pressure sensitive adhesive layer, preferably no more than 50%. When the adhesive free area is less than 25%, moisture permeability or breath-ability is affected. When the adhesive free area is more than 75%, adhesion may be too low to adhere to skin.

Typically, the ratio of the width (C) of the linear strip between the parallelogrammic openings to the minor diagonal line length (B) is from 0.1 to 3, when (C) is measured at the narrowest point between the minor diagonal lines (B) of adjacent parallelogrammic openings, measured in a direction parallel to the minor diagonal length (B). If the ratio of the width (C) of the linear adhesive strip between a minor diagonal line length (B) to the minor diagonal line length (B) of the adjacent parallelogram opening is larger than 3, the pattern of the adhesive layer may be too much different from the surface pattern of a skin and, in addition, the ratio of the openings to the overall surface of the adhesive layer may be too small. This could result in low adhesion to skin and/or the pain in peeling the tape may be significant. On the contrary, if the ratio is smaller than 0.1, the adhesive layer would not be in the desired lattice pattern.

In preferred embodiments, to retain the pattern such as those described above, the adhesive is polymerized, coated and then cross-linked by the sequential steps of (a) polymerizing the adhesive components to form a pressure sensitive adhesive; (b) coating the pressure sensitive adhesive in a pattern and (b) thereafter exposing the adhesive layer to a radiation source having a maximum spectral output occurring at a wavelength of less than 300 nm. In a preferred embodiment, the polymerization of the adhesive components comprises exposing the adhesive components to a radiation source having a maximum spectral output occurring at a wavelength of greater than 300 nm, although other polymerization methods are contemplated within the present invention.

In one embodiment, the pattern as described above is coated using the coating methods as that described in PCT Publication WO 94/111175; U.S. Pat. Nos. 5,866,249; 7,105,225; and PCT Publication No. WO 03/089153. In a preferred embodiment, the pattern is coated with a rotary rod contact die, such as those manufactured by SIMPLAS (Bisuschio, Italy). In an alternative embodiment, a process for coating in a pattern the pattern described above can be done with a heatable direct gravure coater, which is knife-coated both with a rigid and an elastic knife in the adhesive take-up as described in U.S. Pat. No. 5,641,506.

While rotary rod die-coating, the adhesive may be expanded when an adhesive coating liquid is applied onto a substrate to form an adhesive layer thereon and therefore the polymer molecules constituting the adhesive layer may be oriented. The orientation of the polymer molecules may give suitable toughness to the adhesive layer, and, as a result, the adhesive layer may be an adhesive tape without a supporting substrate (e.g., a self-sustainable adhesive tape).

In addition, the orientation of the polymer molecules constituting the adhesive layer is also advantageous for an adhesive tape having an adhesive layer supported by a supporting substrate. In many cases, in general, a supporting substrate is stretched or oriented in the machine direction. With a supporting substrate, the elasticity behavior in the machine direction differs from the elasticity behavior in the cross direction that is perpendicular to the machine direction. On the other hand, an adhesive layer with no orientation of polymer molecules therein is elastic in the same manner in every direction. When such an adhesive layer with no orientation of polymer molecules therein is formed on the supporting substrate, then the elasticity behavior of the adhesive layer differ from that of the substrate. Accordingly, tension develops between the substrate and the adhesive layer, therefore producing a force in the direction different from the expanding direction of the tape. As a result, a user may have an unpleasant feel when an adhesive tape stuck thereto expands or contracts.

When the adhesive layer is formed according to a rotary die-coating method, the polymer molecules of constituting the adhesive layer may be oriented in the same direction as the orientation direction of the substrate while the adhesive layer is formed on the substrate. As a result, therefore, the unpleasant feel of the adhesive tape may be reduced while the tape is stuck to a user and while it expands or contracts on the user's skin.

The following examples are offered to aid in understanding of the present invention and are not to be construed as limiting the scope thereof. Unless otherwise indicated, all parts and percentages are by weight.

EXAMPLES

The following examples are offered to aid in understanding of the present invention and are not to be construed as limiting the scope thereof. Unless otherwise indicated, all parts and percentages are by weight.

| Glossary of Components | |
|---|---|
| Acronym | Description |
| 2-EHA | 2-Ethylhexyl Acrylate |
| AA | Acrylic Acid |
| IOA | Iso-octylAcrylate |
| BA | Butyl Acrylate |
| 2MBA | 2-Methyl Butyl Acrylate |
| IBOA | Isobornyl Acrylate |
| n-OA | n-Octyl Acrylate |
| MA | Methyl Acrylate |
| IRGACURE 184 | Photo-initiator from Ciba-Geigy, Ardsley, N.Y |
| IRGACURE 651 | Photo-initiator from Ciba-Geigy, Ardsley, N.Y |
| IOTG | Iso-octyl Thioglycolate |
| IRGANOX 1010 | Antioxidant from Ciba-Geigy, Ardsley, N.Y. |
| ABP | Acrylated benzophenone prepared as described in U.S. Pat. No. 4,737,559 |
| HDDA | Hexanediol diacrylate |
| PLURONIC 25R4 | A block copolymer of poly(ethylene oxide) and poly(propylene oxide)) from BASF, Mt. Olive, N.J. |
| PEBAX | polyether-amide block copolymer available from Elf-Atochem North America (Philadelphia, Pa.). |
| Styrene Macromer | Acrylated styrene of 10,000 MW prepared as in Example 1M of U.S. Pat. No. 4,693,776 |
| ESTANE | ESTANE 58237 available from Noveon, Inc. (Cleveland, OH) |

Test Methods
Creep Compliance Test

The procedure was adapted from that used in U.S. Pat. No. 4,737,559 using a parallel plate creep compliance rheometer. An adhesive formulation was coated as a continuous layer roughly 150 microns thick on to a silicone coated polyester for characterization by Creep Compliance Testing.

The procedure used a 500 gram weight applied to the sample for 3 minutes, with the displacement recorded, then the weight was removed and the displacement 3 minutes after the stress was removed was recorded. This displacement after the load was removed (at 6 minutes) subtracted from the displacement with the load (at 3 minutes) divided by displacement with the load (at 3 minutes) gave the Recovery % in the Creep Compliance Test.

Cold Flow Test

Cold flow testing was done with pattern coated samples. Samples were put into an oven at 66° C. for 19 days (D19) and 57 days (D57). After 19 days and 57 days, examples were observed and rated with the following criteria.

+: Adhesive doesn't flow (The pattern cells still remained)

−: Adhesive flows (The pattern cells collapsed)

Evaluation of Adhesion to Skin and Skin Moisture Content

The adhesion to skin immediately after application and after being adhered 24 hours (T0 and T24), and the skin moisture content after application were measured. The measurement methods are described below.

Adhesion to Skin (T0, T24)

The samples were pressed into place with a 2-kg roller moved at a rate of approximately 25 mm/sec with a single forward and reverse pass. The samples were then removed after 0 hours (T0) and 24 hours after application (T24). The removal angle was 180 degrees. A removal rate of 150 mm/min was applied using a I-MASS tester (commercially available from IMASS, Inc.; Accord, Mass.). The measured force required to effect removal of each tape sample was reported (as an average of two sample replications) in grams per 25 mm width.

Skin Moisture Content Test

The samples were pressed into place with a 2-kg roller moved at a rate of approximately 25 mm/sec with a single forward and reverse pass. The samples were then removed after 24 hours (T24) application at a removal angle of 180 degrees. A removal rate of 150 mm/min was applied using a I-MASS tester. After sample removal, a Cornrometore CM820 (Courage+Khazaka Electronic Gmbh; Cologne, Germany) measured the "skin wetness" at the skin area where tape was applied and at a skin area where tape was not applied. The following formula was used to calculate the skin moisture content:

[Skin moisture content]=[Skin wetness at tape applied area]−[Skin wetness at non taped area]

When the value of the Skin moisture content was more than 10, the skin where the tape was applied was characterized as being sweaty.

EXAMPLE 1

A pressure sensitive adhesive composition was prepared in the following manner to give Adhesive Formulation 1. The composition was prepared by mixing 60 parts of IOA, 40 parts of BA, 0.02 parts of IRGACURE 184, 0.02 parts of IOTG, 0.05 parts of ABP, and 0.5 parts of IRGANOX 1010. The composition was degassed using a bubbling nitrogen gas stream for several minutes. Then the composition was placed into the EVA film bag and sealed to exclude oxygen. The bagged composition was exposed to UV-A-B light for 12 minutes.

The resulting material was die coated at 149° C. with a rotary rod contact die onto the release side of a 50.0-micrometer thick polyester film supplied with a silicone coating on one side.

Other coating conditions were as follows:

| | |
|---|---|
| adhesive opening area(uncoated) %: | 50% |
| length of (A) of parallelogram opening: | 2 mm |
| length of (B) of parallelogram opening: | 1 mm |
| density of the adhesive opening areas: | 25/cm$^2$ |
| adhesive coating weight: | 25.1 g/m$^2$ |

The coated adhesive sheet was then exposed to UV-C light (70 mJ) for less than 60 seconds to crosslink the adhesive. This coated adhesive layer was then laminated to an ESTANE polyurethane film for cold flow testing and testing on skin.

The Adhesive Formulation 1 was also coated as a continuous layer for Creep Compliance testing. The Adhesive Formulation 1 had a Recovery % of 57.4%. The results of Creep Compliance Testing and cold flow are presented in Table 2.

EXAMPLEs 2-13 and Comparative Examples A-K

Pressure sensitive adhesive compositions were prepared using the procedure described in Example 1 for Adhesive Formulation 1. The components of the formulations varied as defined in Table 1(a-c) and were all exposed to UV-A-B radiation to cure the formulations. Example 2-13 and Comparative Examples A-K were then prepared by coating these formulations using the conditions and pattern as described in Example 1. Table 1(a-c) designates those samples that were further exposed to UV-C and Gamma radiation before testing. The results of Creep Compliance Testing and cold flow are presented in Table 2.

EXAMPLE 14

A pressure sensitive adhesive composition was prepared according to the Adhesive Formulation 5 and blended with PEBAX by extruder before exposure to UV-C radiation. The amount of PEBAX was 10 weight %. The blended adhesive was labeled Adhesive Formulation 25. Adhesive Formulation 25 was coated using the same conditions and pattern as in Example 1 and exposed to UV-C radiation (70 mJ). The coated adhesive layer was then laminated to ESTANE polyurethane film for further testing.

Adhesive Formulation 25 was also coated as a continuous layer for Creep Compliance testing. Adhesive Formulation 25 had a Recovery % of 55.2%. The results of Creep Compliance Testing and cold flow are presented in Table 2.

EXAMPLE 15

A pressure sensitive adhesive composition was prepared according to the Adhesive Formulation 24 and blended with PEBAX by extruder. It was not exposed to UV-C radiation. The amount of PEBAX was 10% by weight. The blended adhesive was labeled Adhesive Formulation 26. Adhesive Formulation 26 was coated using the same conditions and pattern as in Example 1. The coated adhesive layer was then laminated to ESTANE polyurethane film for further testing.

Adhesive Formulation 26 was also coated as a continuous layer for Creep Compliance testing. Adhesive Formulation 26 had a Recovery % of 60.4%. The results of Creep Compliance Testing and cold flow are presented in Table 2.

EXAMPLE 16

A pressure sensitive adhesive composition was prepared as in Example 1 to give Adhesive Formulation 27. The composition was made by mixing 96 parts of 2-EHA, 2 parts of AA, 2 parts of a Styrene Macromer, and 0.05 parts of IOTG and exposing to UV-A-B radiation.

Adhesive Formulation 27 was die coated at 160° C. with a rotary rod contact die onto the release side of a 50.0-micrometer thick polyester film supplied with a silicone coating on one side using the other conditions and pattern defined in Example 1. The coated adhesive sheet was exposed to UV-C (70 mJ) and laminated to ESTANE polyurethane film.

Adhesive Formulation 27 was also coated as a continuous layer for Creep Compliance testing. Adhesive formulation 27 had a Recovery % of 45.4%. The results of Creep Compliance Testing and cold flow are presented in Table 2.

EXAMPLE 17

A pressure sensitive adhesive composition was prepared as in Example 1 to give Adhesive Formulation 28. The composition was made by mixing 96 parts of 2-EHA, 2 parts of AA, 2 parts of Styrene Macromer, and 0.075 parts of IOTG and exposing to UV-A-B radiation.

Adhesive Formulation 28 was die coated at 149° C. with a rotary rod contact die onto the release side of a 50.0-micrometer thick polyester film supplied with a silicone coating on one side using the other conditions and pattern defined in Example 1. The coated adhesive sheet was exposed to UV-C (70 mJ) and laminated to ESTANE polyurethane film.

Adhesive Formulation 28 was also coated as a continuous layer for Creep Compliance testing. Adhesive Formulation 28 had a Recovery % of 37.5%. The results of Creep Compliance Testing and cold flow are presented in Table 2.

EXAMPLE 18

A pressure sensitive adhesive composition was prepared as in Example 1 to give Adhesive Formulation 29. The composition was made by mixing 96 parts of 2-EHA, 2 parts of AA, 2 parts of a styrene macromer, and 0.05 parts of IOTG and exposing to UV-A-B radiation.

Adhesive Formulation 29 was die coated at 149° C. with a rotary rod contact die onto the release side of a 50.0-micrometer thick polyester film supplied with a silicone coating on one side using the conditions and pattern defined in Example 1. The coated adhesive sheet was exposed to UV-C (70 mJ) and laminated to ESTANE polyurethane film. The laminated sheet was then exposed to gamma irradiation (30-35 kGy).

Adhesive Formulation 29 was also coated as a continuous layer for Creep Compliance testing. Adhesive Formulation 29 had a Recovery % of 84.1%. The results of Creep Compliance Testing and cold flow are presented in Table 2.

EXAMPLE 19

A pressure sensitive adhesive composition was prepared as in Example 1 to give Adhesive Formulation 30. The composition was made by mixing 96 parts of 2-EHA, 2 parts of AA, 2 parts of a styrene macromer, and 0.075 parts of IOTG.

Adhesive Formulation 30 was die coated at 149° C. with a rotary rod contact die onto the release side of a 50.0-micrometer thick polyester film supplied with a silicone coating on one side using the other conditions and pattern defined in Example 1. The coated adhesive sheet was exposed to UV-C (70 mJ) and laminated to ESTANE polyurethane film. The laminated sheet was then exposed to gamma irradiation (30-35 kGy).

Adhesive Formulation 30 was also coated as a continuous layer for Creep Compliance testing Adhesive Formulation 30 had recovery % of 85.0%. The results of Creep Compliance Testing and cold flow are presented in Table 2.

EXAMPLE 20

A pressure sensitive adhesive was prepared as in Adhesive Formulation 12. The resulting material was die coated at 149° C. with a rotary rod contact die onto the release side of a 50.0-micrometer thick polyester film supplied with a silicone coating on one side.

Other coating conditions were as follows:

| | |
|---|---|
| adhesive opening area(uncoated) %: | 25% |
| length of (A) of parallelogram opening: | 2 mm |
| length of (B) of parallelogram opening: | 1 mm |
| density of the adhesive opening areas: | 12.5/cm$^2$ |
| adhesive coating weight: | 25.1 g/m$^2$ |

The coated adhesive sheet was then exposed to UV-C light (70 mJ) for less than 60 seconds to crosslink the adhesive. This coated adhesive layer was then laminated to an ESTANE polyurethane film for testing on skin. The adhesion to skin and skin moisture content for Example 20 and Example 12 (50% open area) are in Table 3.

EXAMPLE 21

A pressure sensitive adhesive was prepared as in Adhesive Formulation 12. The resulting material was die coated at 149° C. with a rotary rod contact die onto the release side of a 50.0-micrometer thick polyester film supplied with a silicone coating on one side.

Other coating conditions were as follows:

| | |
|---|---|
| adhesive opening area(uncoated) %: | 75% |
| length of (A) of parallelogram opening: | 2 mm |
| length of (B) of parallelogram opening: | 1 mm |
| density of the adhesive opening areas: | 37.5/cm$^2$ |
| adhesive coating weight: | 25.1 g/m$^2$ |

The coated adhesive sheet was then exposed to UV-C light (70 mJ) for less than 60 seconds to crosslink the adhesive. This coated adhesive layer was then laminated to a ESTANE polyurethane film for testing on skin.

Comparative Example L

A pressure sensitive adhesive was prepared as in Adhesive Formulation 12. The resulting material was die coated at 149° C. with a rotary rod contact die onto the release side of a 50.0-micrometer thick polyester film supplied with a silicone coating on one side.

Other coating conditions were as follows:

| | |
|---|---|
| adhesive opening area(uncoated) %: | 15% |
| length of (A) of parallelogram opening: | 2 mm |
| length of (B) of parallelogram opening: | 1 mm |
| density of the adhesive opening areas: | 7.5/cm$^2$ |
| adhesive coating weight: | 25.1 g/m$^2$ |

The coated adhesive sheet was then exposed to UV-C light (70 mJ) for less than 60 seconds to crosslink the adhesive. This coated adhesive layer was then laminated to an ESTANE polyurethane film for testing on skin. The adhesion to skin and skin moisture content for Comparative Example L are in Table 3.

TABLE 1a

Adhesive formulation and Recovery value

| Components and Exposure | ADHESIVE FORMULATION IN PARTS BY WEIGHT ||||||||| 
| | No. 1 | No. 2 | No. 3 | No. 4 | No. 5 | No. 6 | No. 7 | No. 8 | No. 9 |
|---|---|---|---|---|---|---|---|---|---|
| 2-EHA | | | | | | | | | |
| AA | | | | | | | | | |
| IOA | 60 | 60 | 50 | 50 | 55 | 60 | 85 | 85 | 85 |
| BA | 40 | 40 | 50 | 50 | 45 | | | | |
| 2MBA | | | | | | 40 | | | |
| IBOA | | | | | | | 15 | | |
| n-OA | | | | | | | | 15 | |
| MA | | | | | | | | | 15 |
| IRGACURE 184 | 0.3 | 0.3 | 0.3 | 0.3 | 0.3 | 0.3 | 0.3 | 0.3 | 0.3 |
| IRGACURE 651 | | | | | | | | | |
| IOTG | 0.02 | 0.04 | 0.02 | 0.04 | 0.03 | 0.03 | 0.03 | 0.03 | 0.03 |
| IRGANOX 1010 | 0.5 | 0.5 | 0.5 | 0.5 | 0.5 | 0.5 | 0.5 | 0.5 | 0.5 |
| ABP | 0.05 | 0.05 | 0.05 | 0.05 | 0.05 | 0.05 | 0.05 | 0.05 | 0.05 |
| HDDA | | | | | | | | | |
| Pluronic 25R4 | | | | | | | | | |
| UV-C | + | + | + | + | + | + | + | + | + |
| Gamma | | | | | | | | | |
| Recovery (% Rec) | 57.4 | 46.2 | 59.3 | 43.8 | 46.9 | 46.5 | 43.7 | 47.8 | 47.9 |

TABLE 1b

Adhesive formulation and Recovery value

| Components and Exposure | ADHESIVE FORMULATION IN PARTS BY WEIGHT ||||||||| 
| | No. 10 | No. 11 | No. 12 | No. 13 | No. 14 | No. 15 | No. 16 | No. 17 | No. 18 |
|---|---|---|---|---|---|---|---|---|---|
| 2-EHA | | | 96.5 | 95.8 | 65 | | | | |
| AA | | | 3.5 | 3.4 | 15 | | | | |
| IOA | 55 | 55 | | | | 60 | 60 | 50 | 50 |
| BA | 45 | 45 | | | | 40 | 40 | 50 | 50 |
| 2MBA | | | | | | | | | |
| IBOA | | | | | | | | | |
| n-OA | | | | | | | | | |
| MA | | | | | | | | | |
| IRGACURE 184 | 0.3 | 0.3 | 0.5 | | 0.5 | 0.3 | 0.3 | 0.3 | 0.3 |
| IRGACURE 651 | | | | 0.15 | | | | | |
| IOTG | 0.03 | 0.03 | 0.05 | 0.0125 | 0.03 | 0.02 | 0.04 | 0.02 | 0.04 |
| IRGANOX 1010 | 0.5 | 0.5 | 0.5 | 0.5 | 1 | 0.5 | 0.5 | 0.5 | 0.5 |
| ABP | 0.03 | | 0.05 | | | | | | |
| HDDA | | 0.005 | | 0.009 | 0.003 | | | | |
| Pluronic 25R4 | | | | | 20 | | | | |
| UV-C | + | | + | | | | | | |
| Gamma | | | | | | | | | |
| Recovery (% Rec) | 43.0 | 45.8 | 48.8 | 27.2 | 33.9 | 27.6 | 5.1 | 32.7 | 8.1 |

TABLE 1c

Adhesive formulation and Recovery value

| Components and Exposure | ADHESIVE FORMULATION IN PARTS BY WEIGHT ||||||
| | No. 19 | No. 20 | No. 21 | No. 22 | No. 23 | No. 24 |
|---|---|---|---|---|---|---|
| 2-EHA | | | | | 65 | |
| AA | | | | | 15 | |
| IOA | 55 | 60 | 85 | 85 | 85 | |
| BA | 45 | | | | | |
| 2MBA | | 40 | | | | |
| IBOA | | | 15 | | | |
| n-OA | | | | 15 | | |
| MA | | | | | | 15 |

TABLE 1c-continued

Adhesive formulation and Recovery value

| Components and Exposure | ADHESIVE FORMULATION IN PARTS BY WEIGHT | | | | | |
|---|---|---|---|---|---|---|
| | No. 19 | No. 20 | No. 21 | No. 22 | No. 23 | No. 24 |
| IRGACURE 184 | 0.3 | 0.3 | 0.3 | 0.3 | 0.3 | 0.5 |
| IRGACURE 651 | | | | | | |
| IOTG | 0.03 | 0.03 | 0.03 | 0.03 | 0.03 | 0.03 |
| IRGANOX 1010 | 0.5 | 0.5 | 0.5 | 0.5 | 0.5 | 1 |
| ABP | | | | | | |
| HDDA | | | | | | 0.003 |
| Pluronic 25R4 | | | | | | 20 |
| UV-C | | | | | | |
| Gamma | | | | | | + |
| Recovery (% Rec) | 17.8 | 15.5 | 10.6 | 18.5 | 21.3 | 41.3 |

TABLE 2

Shear Creep and Cold Flow Results

| EXAMPLE | Adhesive Formulation No. | Recovery % | Score D19 | Score D57 |
|---|---|---|---|---|
| Example 1 | 1 | 57.4 | + | + |
| Example 2 | 2 | 46.2 | + | + |
| Example 3 | 3 | 59.3 | + | + |
| Example 4 | 4 | 43.8 | + | + |
| Example 5 | 5 | 46.9 | + | + |
| Example 6 | 6 | 46.5 | + | + |
| Example 7 | 7 | 43.7 | + | + |
| Example 8 | 8 | 47.8 | + | + |
| Example 9 | 9 | 47.9 | + | + |
| Example 10 | 10 | 43.0 | + | + |
| Example 11 | 11 | 45.6 | + | + |
| Example 12 | 12 | 48.8 | + | + |
| Comparative Example A | 13 | 27.2 | − | − |
| Comparative Example B | 14 | 33.9 | − | − |
| Comparative Example C | 15 | 27.6 | − | − |
| Comparative Example D | 16 | 5.1 | − | − |
| Comparative Example E | 17 | 32.7 | − | − |
| Comparative Example F | 18 | 8.1 | − | − |
| Comparative Example G | 19 | 17.8 | − | − |
| Comparative Example H | 20 | 15.5 | − | − |
| Comparative Example I | 21 | 10.6 | − | − |
| Comparative Example J | 22 | 18.5 | − | − |
| Comparative Example K | 23 | 21.3 | − | − |
| Example 13 | 24 | 41.3 | + | + |
| Example 14 | 25 | 55.2 | + | + |
| Example 15 | 26 | 60.4 | + | + |
| Example 16 | 27 | 45.4 | + | + |
| Example 17 | 28 | 37.5 | + | + |
| Example 18 | 29 | 84.1 | + | + |
| Example 19 | 30 | 85.0 | + | + |

+: Adhesive pattern shape did not change. (Pattern shape still remains very well.)
−: Adhesive pattern shape changed. (Pattern cells already collapsed.)

Table 2 results show that an adhesive, with Recovery % of the adhesive that was more than 35%, was able to keep its pattern shape.

TABLE 3

Adhesion to Skin and Skin Moisture Content

| Example No. | Adhesive Formulation No. | Adhesive open area % | Adhesion to skin g/25 mm T0 | Adhesion to skin g/25 mm T24 | Skin moisture content |
|---|---|---|---|---|---|
| Example 12 | 12 | 50 | 25 | 75 | −0.2 |
| Example 20 | 12 | 25 | 35 | 86 | 0.2 |
| Example 21 | 12 | 75 | nd | nd | nd |
| Comparative Example L | 12 | 15 | 37 | 90 | 12 | nd - values not reported

Table 3 shows the value of adhesion to skin, and the result of the skin moisture content measurements. The results show that examples with an open area from 25 to 75% in the pressure sensitive adhesive layer gave good skin adhesion without high skin moisture content.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A medical adhesive tape, comprising a hot melt pressure sensitive adhesive layer in a pattern comprising at least two linear strips of pressure sensitive adhesive crossing each other to form a lattice pattern;
   wherein a plurality of parallelogrammic openings free of adhesive are formed by the strips in the lattice pattern, with each parallelogrammic opening having a major diagonal line (A), a minor diagonal line (B);
   wherein the length of the major diagonal line (A) is from 0.5 mm to 10 mm; the length of the minor diagonal line (B) is from 0.3 to 7 mm; and
   wherein the adhesive free area defined by the parallelogrammic openings is greater than 25%; and
   wherein the hot-melt pressure sensitive adhesive layer has a recovery of at least 35% as measured by the Creep Compliance test.

2. The medical adhesive tape of claim 1, wherein the ratio of the width (C) of the linear adhesive strip between the parallelogrammic openings to the minor diagonal line length (B) is from 0.1 to 3 when (C) is measured at the narrowest point between the minor diagonal lines (B) of adjacent parallelogrammic openings.

3. The medical adhesive tape of claim 1, wherein the ratio of the major diagonal line (A) of the opening to the minor diagonal line (B) thereof is from 15 to 1.

4. The medical adhesive tape of claim 1, wherein the density of parallelogrammic openings is at least 5 openings per cm$^2$.

5. The medical adhesive tape of claim 1, wherein the density of the parallelogrammic openings is at most 150 openings per cm$^2$.

6. The medical adhesive tape of claim 1, wherein the thickness of the adhesive layer is from 5 to 1000 μm.

7. The medical adhesive tape of claim 1, wherein the coating weight of the adhesive layer is from 7 to 200 g/m$^2$.

8. The medical adhesive tape of claim 1, wherein the pressure sensitive adhesive comprises a copolymer of (i) at least one monoethylenic unsaturated (meth)acrylate having an alkyl group with at least 4 carbon atoms on average and (ii) at least one monoethylenic unsaturation-reinforcing monomer.

9. The medical adhesive tape of claim 1, wherein the pressure sensitive adhesive layer further comprises a film-forming component.

10. The medical adhesive tape of claim 9, wherein the film-forming component comprises a non-tacky thermoplastic resin having a softening point falling within a range of 25 to 300° C.

11. A medical adhesive tape, comprising a hot-melt pressure sensitive adhesive layer with a pattern comprising at least two linear strips of pressure sensitive adhesive crossing each other to form a lattice pattern;
   wherein a plurality of parallelogrammic openings free of adhesive are formed by the strips in the lattice pattern, with each parallelogrammic opening having a major diagonal line (A), a minor diagonal line (B);
   wherein the length of the major diagonal line (A) is from 0.5 mm to 10 mm; the length of the minor diagonal line (B) is from 0.3 to 7 mm; and
   wherein the adhesive free area defined by the parallelogrammic openings is greater than 25%; and
   wherein the pressure sensitive adhesive layer does not exhibit flow after at least 19 days at 66° C.

12. The medical adhesive tape of claim 11, wherein the hot-melt pressure sensitive adhesive layer has a recovery of at least 35% as measured by the Creep Compliance test.

13. The medical adhesive tape of claim 11, wherein the ratio of the width (C) of the linear adhesive strip between the parallelogrammic openings to the minor diagonal line length (B) is from 0.1 to 3 when (C) is measured at the narrowest point between the minor diagonal lines (B) of adjacent parallelogrammic openings.

14. The medical adhesive tape of claim 11, wherein the density of parallelogrammic openings is at least 5 openings per cm$^2$.

15. The medical adhesive tape of claim 11, wherein the density of the parallelogrammic openings is at most 150 openings per cm$^2$.

16. The medical adhesive tape of claim 11, wherein the thickness of the adhesive layer is from 5 to 1000 μm.

17. The medical adhesive tape of claim 11, wherein the coating weight of the adhesive layer is from 7 to 200 g/m$^2$.

18. The medical adhesive tape of claim 11, wherein the pressure sensitive adhesive comprises a copolymer of (i) at least one monoethylenic unsaturated (meth)acrylate having an alkyl group with at least 4 carbon atoms on average and (ii) at least one monoethylenic unsaturation-reinforcing monomer.

19. The medical adhesive tape of claim 11, wherein the pressure sensitive adhesive layer further comprises a film-forming component.

20. A medical adhesive tape, comprising a hot-melt pressure sensitive adhesive layer with a pattern comprising at least two linear strips of pressure sensitive adhesive crossing each other to form a lattice pattern;
   wherein a plurality of parallelogrammic openings free of adhesive are formed by the strips in the lattice pattern, with each parallelogrammic opening having a major diagonal line (A), a minor diagonal line (B);
   wherein the length of the major diagonal line (A) is from 0.5 mm to 10 mm; the length of the minor diagonal line (B) is from 0.3 to 7 mm; and the ratio of the width (C) of the linear adhesive strip between the parallelogrammic openings to the minor diagonal line length (B) is from 0.1 to 3 when (C) is measured at the narrowest point between the minor diagonal lines (B) of adjacent parallelogrammic openings;
   wherein the pressure sensitive adhesive layer has a recovery of at least 35% as measured by the Creep Compliance test.

* * * * *

UNITED STATES PATENT AND TRADEMARK OFFICE
CERTIFICATE OF CORRECTION

PATENT NO. : 7,947,366 B2
APPLICATION NO. : 11/687841
DATED : May 24, 2011
INVENTOR(S) : Hironobu Ishiwatari It is certified that error appears in the above-identified patent and that said Letters Patent is hereby corrected as shown below:

On the Title Page
Item (57) (Abstract); Line 1, Delete "a dhesive" and insert -- adhesive --, therefor.

Column 4
Line 40; Delete "acetonacrylamide," and insert -- acetoneacrylamide, --, therefor.

Column 5
Line 26; Delete "fibrinous" and insert -- fibrillous --, therefor.

Column 6
Line 32-33; Delete "acrylamidacetophenone," and insert -- acrylamideacetophenone, --, therefor.

Column 7
Line 20; Delete "IRGRACURE" and insert -- IRGACURE --, therefor.
Line 32-33; Delete "halogenohydrocarbons" and insert -- halogenhydrocarbons --, therefor.

Column 10
Line 2; Delete "intereference" and insert -- interference --, therefor.

Column 13
Line 24; Delete "Cornrometore" and insert -- Corneometer --, therefor.

Column 14
Line 3; Delete "EXAMPLEs" and insert -- EXAMPLES --, therefor.

Signed and Sealed this
Ninth Day of August, 2011

David J. Kappos
*Director of the United States Patent and Trademark Office*